3,283,552
PNEUMATIC CONTROL
Allen R. Hollister, East Hartford, Conn., assignor to Pratt and Whitney Inc., a corporation of Delaware
Filed Aug. 30, 1963, Ser. No. 305,613
12 Claims. (Cl. 72—16)

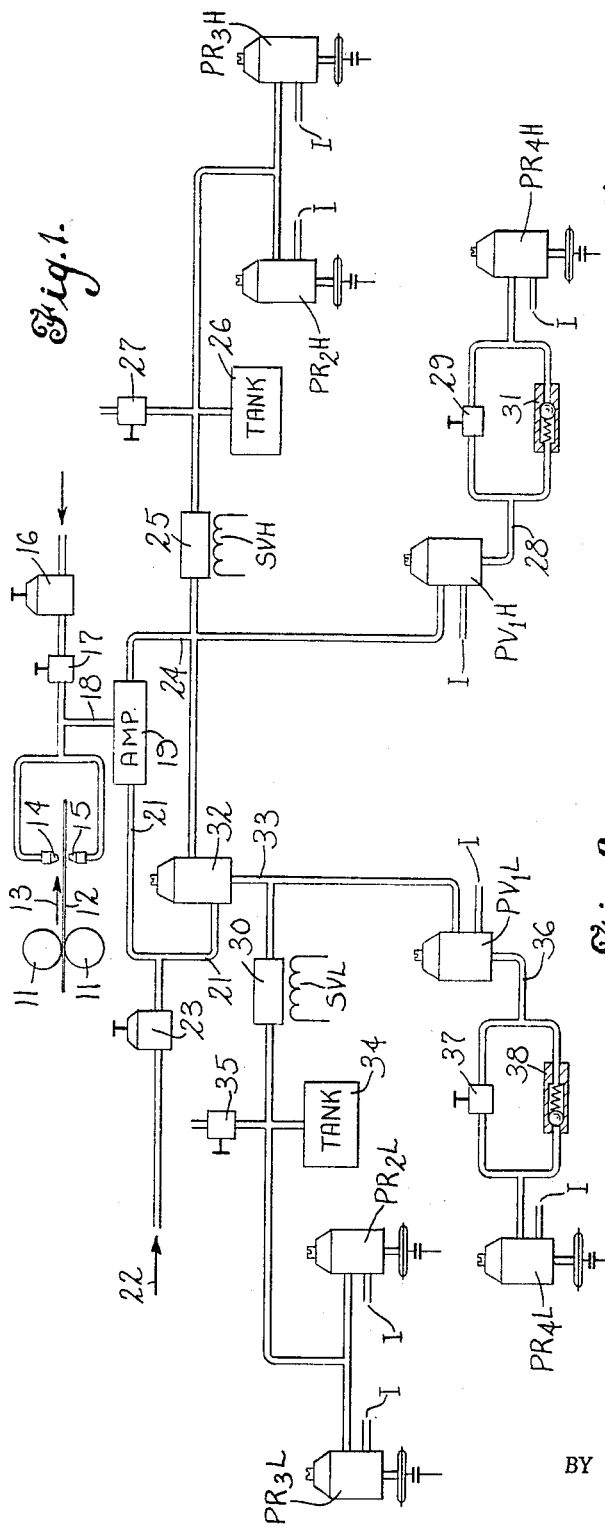
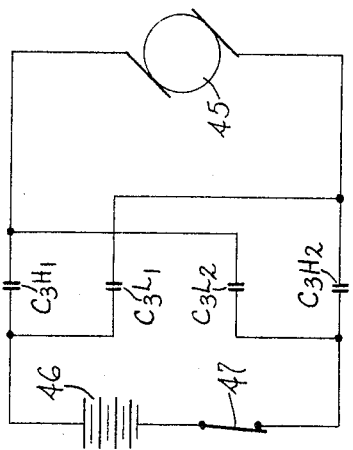
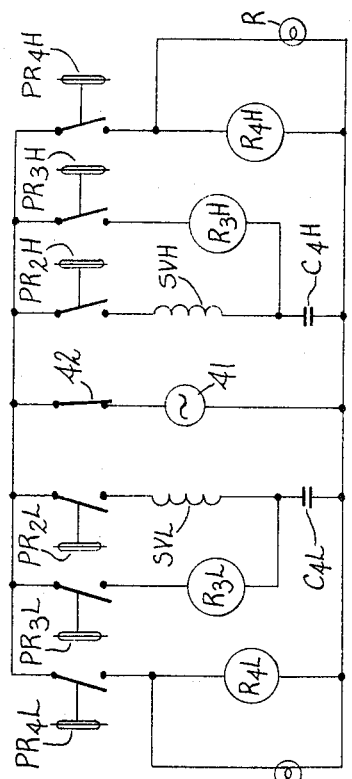
Nov. 8, 1966     A. R. HOLLISTER     3,283,552
PNEUMATIC CONTROL
Filed Aug. 30, 1963
INVENTOR
Allen R. Hollister
BY
Rockwell and De Lio
ATTORNEYS

United States Patent Office 3,283,552
Patented Nov. 8, 1966

This invention relates generally to a pneumatic control adapted to deliver an electrical output in response to a pneumatic input. While not so limited, the invention is especially adapted for use in controlling the thickness of strip continuously delivered from a rolling mill responsive to pneumatically-sensed changes in strip thickness.

Because of the high speed and continuous operation, it is desirable that a check be continuously made on the thickness of strip delivered from a rolling mill, but it is highly undesirable to utilize any measuring instrument which comes in contact with the strip. For this reason, noncontacting pneumatic gages have been developed to continuously gage the strip so that the size of the strip may be read by the mill operator. Since the rolling takes place at high speed, it is preferable to provide automatic compensation of the mill rather than depend upon manual adjustments made by the operator when he notes from the gage that the thickness of the strip is outside of the allowed tolerances. Since an automatically compensating system will operate continuously while a gaging-to-manual adjustment system will operate only when it commands the attention of the operator, the automatic system will result in the production of higher quality strip due to the increase in quality control.

The thickness of strip being rolled by a rolling mill is most often controlled by the spacing of the mill rolls between which the strip passes. In other instances, the strip thickness may be controlled by the tension placed on the strip or by a combination of such controls. In any event, the adjustment of these controlling factors, and particularly the adjustment of the spacing of the rolls, will be affected by electric motors mechanically connected to one roll, for example, to move the roll toward or from the other roll. In such a case, these motors are known as the screw-down motors, which can be used to either increase or decrease the spacing between cooperating rolls.

Conversion of pneumatically-read strip thickness to an electric signal for tension control is known from U.S. Patent 2,295,399 issued to C. R. Hanna on September 8, 1942. However, the system converts continuous pneumatic readings to continuous electrical control, thereby continuously controlling the torque or speed of the continuously operating motors driving the tensioning rolls. As will be readily understood, control of the screw-down motors requires intermittent operation to correct the spacing of the mill rolls. This intermittent operation must be responsive to the continuous operation of the pneumatic gaging system since, from maximum effectiveness, the strip should be continuously gaged. Furthermore, care must be taken during the operation of the screw-down motors to prevent overcorrection of the situation. While the aforementioned patent generally relates to a servo-system of the same general class, it neither conceives of nor solves the problem of intermittent electrical signals and overcorrection.

Accordingly, it is an object of this invention to provide intermittent corrective electric signals in response to pneumatically controlled error detection.

Another object of the invention is to provide a system for continuously measuring material delivered from a machine and providing intermittent corrective electric signals for adjusting the settings of the machine.

Still another object of the invention is to provide means for adjusting the settings of a machine through a jogging action in response to pneumatically sensed signals.

A further object of the invention is to provide a pneumatic-electric circuit which will produce an intermittent output in response to a continuous input.

A still further object of the invention is to provide means for automatically adjusting the screw-down rolls of a rolling mill when the size of the strip being rolled by the rolling mill is outside of the desired tolerances, the size being gaged pneumatically, means being provided to prevent overcorrection of the mill adjustment.

Still other objects and advantages of the invention will in part be obvious and will in part be apparent from the specification.

Generally speaking, in accordance with this invention, a machine, such as a mill which continuously delivers material, is provided with a pneumatic gaging circuit for gaging the size of the material. When the gaging circuit senses that the size of the material is outside of the desired tolerance, the pneumatic circuit controls the operation of an electric circuit to adjust the machine to bring the strip back within allowed tolerances. The pneumatic circuit comprises a series of relays which operate at various selected pressures, thereby causing intermittent operation of the electric circuit to jog the machine adjustment until an error signal is no longer pneumatically detected. The jogging action effected by the pneumatic circuit and the settings of the pneumatic relays, prevent or reduce the likelihood of overcorrection of the machine controls.

The invention accordingly comprises the features of construction, combination of elements, and arrangement of parts which will be exemplified in the construction hereinafter set forth, and the scope of the invention will be indicated in the claims.

For a fuller understanding of the invention, reference is had to the following description taken in connection with the accompanying drawings, in which:

FIG. 1 is a schematic representation of the pneumatic circuit incorporating the invention;

FIG. 2 is a schematic diagram of the electric circuit which provides a correction impulse responsive to the changing conditions of the pneumatic circuit; and FIG. 3 is a schematic diagram of an electric circuit for adjusting the mill in response to the changing state of the circuit of FIG. 2.

Referring now to FIG. 1, the pneumatic circuit is indicated, by way of example, as cooperating with a rolling mill. A pair of mill rolls 11, roll strip 12 and the strip is delivered from the mill in the direction of the arrow 13. Of course, it should be understood that the circuit is not limited for use with a rolling mill. A pair of opposed gaging nozzles 14 and 15 are disposed on opposite sides of strip 12 for gaging the size of the strip passing therebetween. Air or other fluid under pressure is supplied from a source (not shown) through a pressure regulator 16 and a restriction 17 to the gaging nozzles. Restriction 17 isolates the air emitted from the gaging nozzles from the air under the pressure controlled by regulator 16 in a manner well known in the gaging art. Because of the proximity of the gaging nozzles to the strip, a back pressure will be created in the line between the gaging nozzles and restriction 17. An increase in the thickness of the strip will cause the surfaces of the strip to be closer to the gaging nozzles, thereby reducing the flow from the gaging nozzles and increasing the back pressure in the line. Conversely, a decrease in the thickness of the strip will cause a decrease in the back pressure. The back pressure is fed through a line 18 to an amplifier 19.

The main source of air under pressure for amplifier 19 will be through a line 21 from a supply source indicated by an arrow 22 through a pressure regulator 23. The outlet of amplifier 19 is through a line 24 and the outlet flow is controlled by the back pressure in line 18. Line 24 connects to a normally open solenoid valve 25 whose outlet communicates with several elements connected in parallel. One element is a storage tank 26 for storing air under pressure. Another element is an adjustable bleed valve 27 providing a bleed to atmosphere. The other two elements are adjustable pneumatic relays $PR_2H$ and $PR_3H$. Each of the pneumatic relays is connected to a separate pressure source (not shown), the inlets being indicated as I. The pressure in the outlet line 24 from amplifier 19 controls the operation of the pneumatic relays. Each pneumatic relay controls a normally open switch which is closed by the firing of the relay when the pressure from the amplifier attains a preselected value. The firing pressure of the pneumatic relays may be individually adjusted.

Line 24 also connects with a pressure-responsive valve $PV_1H$ also having an inlet I for a source of fluid under pressure. The pressure in line 24 controls the operation of pressure valve $PV_1H$. This relay controls the operation of a normally closed valve communicating between the inlet I and an outlet line 28. Outlet line 28 branches to two parallel paths, one having in series an adjustable valve 29, the other having in series a check valve 31. The parallel paths join and communicate with a pneumatic relay $PR_4H$ which is also provided with an independent inlet I. Pneumatic relay $PR_4H$ controls the operation of a normally open switch responsive to the pressure delivered from pressure valve $PV_1H$.

The pneumatic system of FIG. 1 heretofore described is adapted for operation when the back pressure in line 18 exceeds a preselected value due to the fact that the thickness of strip 12 has exceeded the allowed tolerance. If the thickness of strip 12 decreases below the allowed tolerance, the back pressure in line 18 will drop below the desired value. The pneumatic portion of the system heretofore described, which may be termed the "high side" will not be affected when the pressure drops too low since the relays are operated by an increase in pressure, not a decrease. Therefore, a separate portion of the pneumatic circuit is provided for responding to low pressures and this may be termed "the low side."

Since the pneumatic relays respond or operate when the pressure increases, the low side of the pneumatic circuit contains the additional element of a pressure inverter 32 which will convert decreases in pressure to increases in pressure. Referring again to FIG. 1, line 24 is connected to pressure inverter 32 to control the operation thereof. The main supply through regulator 23 is connected to the inlet of pressure inverter 32 and the pressure in the outlet line 33 will fluctuate with the fluctuations of the pressure in line 24. However, a drop in pressure in line 24 will cause a corresponding increase in pressure in line 33. The remainder of the low side circuit is identical to the high side circuit. Line 33 connects to a solenoid valve 30 whose outlet is connected to a tank 34, a bleed valve 35, a pneumatic relay $PR_2L$ and a pneumatic relay $PR_3L$. These two relays control normally open switches in the same manner as their counterpart in the high side circuit. Line 33 also connects to a pressure-responsive valve $PV_1L$ which controls the flow from the inlet I to the outlet line 36. The outlet line 36 branches to two parallel paths, one having in series an adjustable valve 37, the other having in series a check valve 38. These paths join again and connect to a pneumatic relay $PR_4L$ which controls the operation of a normally open switch.

The switches controlled by the several pneumatic relays form part of the electric circuit shown in FIG. 2. The circuit will now be described. The source of energy for the circuit is an A.C. supply 41 connected in series with an on-off switch 42 so that the entire circuit may be manually rendered ineffective. In series with the A.C. source are several parallel paths. The circuit for the high side is indicated to the right of the source 41 in FIG. 2 and will be described first. The first parallel path comprises in series the switch of pneumatic relay $PR_2H$, the solenoid or coil SVH for operating solenoid valve 25, and a contact $C_4H$. The next parallel path consists of the switch of pneumatic relay $PR_3H$ and a relay $R_3H$, this second parallel path being connected into the first parallel path between the solenoid SVH and the contact $C_4H$. The third parallel path includes in series the switch of pneumatic relay $PR_4H$ and a relay $R_4H$ adapted to control the contact $C_4H$. A red light, indicated as R, may bridge the relay $R_4H$ in the third parallel path to visually indicate when the circuit is calling for a correction or shows a reading on the high side.

The electric circuit for the low side is a duplicate of the circuit for the high side. The first parallel path on the low side consists of the switch operated by pneumatic relay $PR_2L$, the solenoid SVL to operate solenoid valve 30, and a contact $C_4L$. The second parallel path consists of a switch operated by pneumatic relay $PR_3L$ and a relay $R_3L$, the second parallel path being connected into the first parallel path between the solenoid SVL and contact $C_4L$. The third parallel path consists of the switch of pneumatic relay $PR_4L$ and a relay $R_4L$, the relay $R_4L$ controlling the operation of contact $C_4L$. A green light G may be provided to bridge the relay $R_4L$ to indicate when the circuit is calling for a correction or showing an error on the low side.

FIG. 3 shows, in simplified form, a circuit diagram which may be used to adjust the settings of the machine. For example, a screw-down motor for adjusting one of the mill rolls 11 is indicated at 45. A D.C. source 46 and a switch 47 are in series with motor 45 for operating the motor. As will be understood, a D.C. motor may be readily reversed by reversing the polarity of the connections of the source. For operating the motor when the high side of the circuit calls for a correction, two contacts $C_3H_1$ and $C_3H_2$ are provided in series with the source and the motor. These contacts are both controlled by relay $R_3H$ in the FIG. 2 circuit and, thus, operate the motor in the forward direction only when relay $R_3H$ is energized. Conversely, contacts $C_3L_1$ and $C_3L_2$ comprise a series circuit with the motor and the D.C. source for operating the motor in the reverse direction when correction on the low side is called for. These contacts are controlled by relay $R_3L$ in the FIG. 2 circuit, thus providing that the motor 45 is driven in the reverse direction only when relay $R_3L$ is energized.

The operation of the high sides of the pneumatic and electric circuits of FIGS. 1 and 2 will now be described. When the thickness of strip 12 increases beyond the allowed tolerance, the surfaces of the strip will more closely approach gaging nozzles 14 and 15, thereby creating an increase in back pressure in line 18. Through amplifier 19, this increase in pressure will result in an increase in pressure in line 24. Since solenoid valve 25 is normally open, the increased pressure will build up in tank 26 even though a small amount of air is being bled to atmosphere through bleed valve 27. When the solenoid valve 25 is open, the bleed of air through bleed valve 27 has little effect because air is continuously flowing from the source indicated at 22 through the lines. The increase in pressure will also be impressed on pneumatic relay $PR_2H$ which is set to fire at the lowest pressure of all the relays on the high side. In the electric circuit of FIG. 2, the closing of switch $PR_2H$ will not energize solenoid SVH because of the normally open condition of contact $C_4H$. The increased pressure will also be impressed on pneumatic relay $PR_3H$ which is adjusted to a higher operating pressure than pneumatic relay $PR_2H$. As a correction is required, the pressure will be high enough to operate pneumatic relay $PR_3H$, thereby closing the switch $PR_3H$ in the FIG. 2 circuit. However, this also will not energize relay $R_3H$ because of the normally open condition of contact $C_4H$. The increased pressure will also be impressed on pressure valve $PV_1H$ and will open the valve to cause pressure flow through the valve into line 28. The operative setting of pressure valve $PV_1H$ is the highest of all for reasons that will be hereafter indicated. Pneumatic relay $PR_4H$ is set to fire with pressure valve $PV_1H$ but the two elements are isolated by the check valve 31 and the adjustable valve 29. As will be apparent from FIG. 1, no flow can occur from pressure valve $PV_1H$ to pneumatic relay $PR_4H$ through the check valve 31. Therefore, all flow must go through adjustable valve 29. Since this valve introduces a restriction in the line, a time delay is introduced in the system between the two elements. Thus, if the increase in pressure at the gaging nozzles was merely due to a high spot in the strip, pneumatic relay $PR_4H$ will not fire. However, if the high reading is continuous, the pressure in pneumatic relay $PR_4H$ will build up through the time delay valve 29 thereby firing the relay and closing switch $PR_4H$ in FIG. 2. Firstly, this will operate the indicator light R to show that a correction on the high side is being called for. Also, the closing of switch $PR_4H$ will complete a circuit to energize relay $R_4H$, thereby closing contact $C_4H$. The closing of contact $C_4H$ has two immediate effects. Since switch $PR_2H$ has already been closed, it energizes solenoid SVH to close solenoid valve 25, thereby isolating relays $PR_2H$ and $PR_3H$ from the flow through line 24. As the switch $PR_3H$ has also previously been closed, the closing of contact $C_4H$ energizes relay $R_3H$, thereby closing the contacts $C_3H_1$ and $C_3H_2$ in the FIG. 3 circuit. This closing of the contacts completes a circuit through motor 45 and commences adjustment of the spacing of the mill rolls.

When solenoid valve 25 has been closed by the energization of solenoid SVH, the pressure in pneumatic relays $PR_2H$ and $PR_3H$ will commence to decay due to the bleed through bleed valve 27. When the pressure in pneumatic relay $PR_3H$ decays below its firing point, the switch $PR_3H$ in FIG. 2 will open thereby deenergizing relay $R_3H$ which opens the contacts $C_3H_1$ and $C_3H_2$ to stop operation of the screw-down motor 45. From the time that contacts $C_3H_1$ and $C_3H_2$ are first closed until the time they are opened may be considered the "on time" of the circuit. Further decay of the pressure through bleed valve 27 reduces the pressure in pneumatic relay $PR_2H$ below its firing point, thereby opening switch $PR_2H$ in the FIG. 2 circuit. When the switch is opened, solenoid SVH will be deenergized thereby opening solenoid valve 25 allowing the fluid under pressure to pass therethrough. If the pressure in the line is still above the firing points of pneumatic relays $PR_2H$ and $PR_3H$, the pneumatic relays will again fire, closing their corresponding switches in the circuit. If the pressure is still such that pneumatic relay $PR_4H$ remains in the fired position, thereby holding closed contact $C_4H$, the solenoid SVH will be energized to close the solenoid valve 25 and the relay $R_3H$ will be energized to complete the circuit through motor 45 to further correct the adjustment of the mill rolls. The time commencing with the deenergization of relay $R_3H$ and ending with the energization of the relay may be considered the "off time." Thus, even though the pressure may continuously call for a correction, the system will fluctuate between the on time and the off time to effect a jogging action of the correcting motor. This tends to prevent overcorrection of the adjustments. Once the pressure in valve $PV_1H$ goes below the firing point of the valve, the pressure in pneumatic relay $PR_4H$ will immediately decay thereby deenergizing relay $R_4H$ and opening contact $C_4H$. This will deenergize solenoid SVH and relay $R_3H$ regardless of the position of switches $PR_2H$ and $PR_3H$. Check valve 31 is provided to assure immediate decay of the pressure in pneumatic relay $PR_4H$ when the pressure drops below the error signal level. By means of check valve 31, the time delay introduced by valve 29 is thereby avoided.

The cycle time of the system will be set by the adjustment of bleed valve 27. The off time will commence when the pressure in pneumatic relay $PR_3H$ decays below its firing point and will cease when the pressure in pneumatic relay $PR_2H$ decays below its firing point. The off time will therefore be a function of the settings of pneumatic relays $PR_3H$ and $PR_2H$ and the rate of decay through bleed valve 27. However, the on time will be a variable dependent upon the amount of correction required. If a high pressure is developed in line 18 as a result of a large increase in the size of the strip, the pressure in pneumatic relay $PR_3H$ will be quite high and the system will remain on until the pressure decays to the relay firing point. However, if the pressure is lower but still requires correction, the system will remain on until decay occurs from this lower pressure to the firing point pressure. It will readily be seen that the time required for decay from the higher pressure will be greater than the time required from the lower pressure, thereby making the on time directly proportional to the magnitude of error. This, of course, does not affect the jogging action of the circuit but provides for a longer on time at the initial stages of correction than at the final stages of correction. This further factor maintains the desired feature of reducing the likelihood of overcorrection while providing for correction in the shortest amount of time.

The operation of the circuit responding to fluctuations in pressure on the low side is substantially identical to the operation of the high side circuit except for the addition of the pressure inverter. The operation of the circuit will, therefore, be briefly described. If the thickness of strip 12 decreases below the allowed tolerance, the surfaces of the strip will be spaced further from nozzles 14 and 15, thereby allowing for an increase of flow from the nozzles with the resultant decrease in back pressure in line 18. Through amplifier 19, this decrease in back pressure will decrease the pressure in line 24 far below any of the pressures to which the high side pressure relays respond. The pressure in line 24 controls pressure inverter 32. The fluctuations in pressure between the inlet line 21 and the outlet line 33 respond inversely to the fluctuations in pressure from the amplifier through line 24. Thus, a decrease in pressure of, for example, 1 p.s.i. in line 24 will result in an increase in pressure of 1 p.s.i. in outlet line 33 of pressure inverter 32. Since a pressure increase is provided in line 33, the pneumatic relays and the pressure valve will fire when their firing points are attained as a result of the in-pressure in line 33 responsive to corresponding decreases in pressure in line 24. The low side of electric circuit of FIG. 2 is a mirror image of the high side of the circuit and adjustment of the mill rolls will occur when relay $R_3L$ is energized. This will cause closure of normally open contacts $C_3L_1$ and $C_3L_2$ in the FIG. 3 circuit, thereby completing a series circuit between D.C. source 46 and the motor 45. It will, however, be apparent that closure of contacts $C_3L_1$ and $C_3L_2$ will reverse the connections of the source to the motor with respect to the connections when contacts $C_3H_1$ and $C_3H_2$ are closed. Thus, during the on time of the high side of the circuit, motor 45 will be driven in one direction while during the on time of the low side of the circuit, motor 45 will be driven in the reverse direction.

In the preferred embodiment of the invention heretofore described, reference was made to utilizing the pneumatic control to adjust the spacing or setting of mill rolls in response to fluctuations in size of the material being continuously rolled and delivered from the mill. However, the system is equally adaptable for use with any machine or system where there is a continual flow of material being measured. For instance, cylindrical parts being ground and delivered from the grinding machine could be continuously gaged and adjustments could be effected in the position of the grinding wheel to compensate for wheel wear or other factors effecting the final size of the parts. By utilization of the pneumatic system described above, jogging adjustments may be made without requiring expensive circuitry and components as might be required of an electronic control performing a similar function.

It will thus be seen that the objects set forth above, among those made apparent from the preceding description are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A pneumatic circuit for controlling the operation of an electric circuit, comprising:
   (a) pneumatic sensing means for developing a pressure signal,
   (b) a first branch line controlled by said sensing means,
   (c) a second branch line controlled by said sensing means,
       (1) said first and second branch lines being in parallel one with another,
   (d) an electrically-operated, normally open valve in said first branch line,
   (e) a bleed valve in said first branch line in series with said normally open valve,
   (f) a first switch-controlling pneumatic relay in said first branch line,
   (g) a second switch-controlling pneumatic relay in said first branch line,
       (1) said first and second pneumatic relays being in parallel with said bleed valve,
   (h) a third pressure relay in said second branch line,
   (i) a valve in said second branch line, and
   (j) a fourth switch-controlling pneumatic relay in said second branch line,
       (1) said third pneumatic relay, said fourth pneumatic relay and said valve being arranged in series, said valve being disposed between said pneumatic relays.

2. A control circuit comprising:
   (a) pneumatic sensing means for gaging the size of material delivered from a machine and producing a back pressure indicative of the size,
   (b) a first path having in series an electrically operated valve,
   (c) a bleed valve in said first path,
   (d) a first pneumatic relay in said first path,
   (e) a second pneumatic relay in said first path,
       (1) said bleed valve, said first pneumatic relay and said second pneumatic relay being in parallel one with another and being in series with said electrically operated valve,
   (f) a second path connected in parallel with said first path, the pressure in said first and second paths being responsive to the back pressure produced by said pneumatic sensing means,
   (g) a third pneumatic relay in said second path, and
   (h) a circuit controlled by said plurality of pneumatic relays, said circuit adapted to regulate the machine to control the size of material delivered therefrom, said circuit also controlling the operation of said electrically operated valve to close said valve during at least a portion of the cycle of regulation of the machine,
whereby the pressure in said first and second pneumatic relays decays through said bleed valve to cause intermittent operation of said circuit.

3. The circuit of claim 2 and further including pressure inverting means acting between said pneumatic sensing means and said first and second paths to provide regulation of the machine when the produced back pressure decreases responsive to a decrease in size of the material below preselected limits.

4. The circuit of claim 2 and further including an adjustable valve in series with said third pneumatic relay and a pressure-responsive valve in series with said adjustable valve, said pressure-responsive valve and said adjustable valve providing for delayed operation of said third pneumatic relay to introduce a time delay into said circuit whereby operation thereof is avoided in response to irregular fluctuations in the size of the material.

5. The circuit of claim 4 and further including a check valve connected in parallel with said adjustable valve between said third pneumatic relay and said pressure-responsive valve, said check valve being so arranged that it is effective only when the pressure in said third pneumatic relay is greater than the pressure in said pressure-responsive valve.

6. A control circuit comprising, pneumatic sensing means for gaging the size of material delivered from a machine and producing a back pressure indicative of the size, a high branch circuit operative in response to an increase in back pressure resultant from an increase in the size of the material beyond preselected limits, said high branch circuit comprising:
   (a) a first path having in series an electrically operated valve,
   (b) a bleed valve in said first path,
   (c) a first pneumatic relay in said first path,
   (d) a second pneumatic relay in said first path,
       (1) said bleed valve, said first pneumatic relay and said second pneumatic relay being in parallel one with another and being in series with said electrically operated valve,
   (e) a second path connected in parallel with said first path, the pressure in said first and second paths being responsive to the back pressure produced by said pneumatic sensing means,
   (f) a pressure-responsive valve in said second path,
   (g) an adjustable valve in series with said pressure-responsive valve,
   (h) a third pneumatic relay in series with said adjustable valve, and
   (i) a circuit controlled by said plurality of pneumatic relays, said circuit adapted to regulate the machine to increase the size of material delivered therefrom, and a low branch circuit operative in response to a decrease in back pressure resultant from a decrease in the size of the material below preselected limits, said low branch circuit comprising:
       (1) a pressure inverter for converting a decrease in pressure produced by said pneumatic sensing means to a corresponding increase in pressure,
       (2) a first path having in series an electrically operated valve,
       (3) a bleed valve in said first path,
       (4) a first pneumatic relay in said first path,
       (5) a second pneumatic relay in said first path,
           (i) said bleed valve said first pneumatic relay and said second pneumatic relay being in parallel one with another and being in series with said electrically operated valve,
       (6) a second path connected in parallel with said first path, the pressure in said first and second paths being responsive to the back pressure produced by said pneumatic sensing means as inverted by said pressure inverter,
       (7) a pressure-responsive valve in said second path,
       (8) an adjustable valve in series with said pressure-responsive valve,
       (9) a third pneumatic relay in series with said adjustable valve, and
       (10) a circuit controlled by said plurality of pneumatic relays, said circuit adapted to regulate the machine to decrease the size of material delivered therefrom,
said circuits also controlling the operation of their respective electrically operated valves to close said valves during at least a portion of the cycle of regulation of the machine by the corresponding branch circuit, whereby the pressure in said first and second pneumatic relays decays through said bleed valve to cause intermittent operation of said circuit.

7. Means for causing intermittent operation of a pneumatic relay connected to a pressure source of sufficient magnitude to cause operation of said pneumatic relay comprising an electrically operated valve, a bleed valve, said electrically operated valve being in series with said source and said pneumatic relay and being disposed therebetween, said bleed valve being in parallel with said pneumatic relay, and a circuit adapted to operate said electrically operated valve, the operation of said circuit being controlled by the operation of said pneumatic relay.

8. For use in combination with a mill having a screw down motor and a circuit for energizing said motor; a control circuit for actuating said energizing circuit, said control circuit including a plurality of pneumatically operated switching means, one of said switching means acting as an interlock on said other switching means so that said other switching means are rendered effective only when said one of said switching means is operated; said other of said switching means when rendered effective by said one of said switching means being arranged to actuate the motor energizing circuit, pneumatic sensing means for gaging the thickness of material delivered from the mill and producing a pneumatic back pressure indicative of the thickness thereof; and means rendering said one of said pneumatically operated switching means effective to sense a change in back pressure only after the change in back pressure has prevailed for a predetermined time, said other of said switching means being rendered effective to actuate said energizing circuit upon termination of said predetermined time.

9. For use in combination with a mill having a screw down motor and a circuit for energizing said motor; a control circuit for actuating said energizing circuit, said control circuit including a plurality of pneumatically operated switching means, one of said switching means acting as an interlock on said other switching means so that said other switching means are rendered effective only when said one of said switching means is operated; pneumatic sensing means for gaging the thickness of material delivered from the mill and producing a pneumatic back pressure indicative of the thickness thereof, said sensing means being effective to actuate said one of said switching means upon detection of a predetermined change in the back pressure, said other of said switching means being rendered effective to actuate said energizing circuit upon detection of said predetermined change in back pressure and actuation of said one of said switching means; and time delay means, said time delay means being effective to deactuate said one of said switching means after a predetermined time interval.

10. The invention of claim 9 wherein the time delay of said time delay means is adjustable.

11. A control circuit comprising pneumatic sensing means for gaging the size of material delivered from a machine and arranged to produce a back pressure indicative of the size, a plurality of pneumatic relays operated in response to the back pressure produced, a circuit controlled by said pneumatic relays, said circuit adapted to regulate the machine to control the size of the material delivered therefrom, means cooperating with at least some of said pneumatic relays to intermittently cause de-activation of certain pneumatic relays, and time delay means cooperating with one of said plurality of pneumatic relays to delay operation of said circuit.

12. The circuit of claim 11 wherein said time delay means comprises a pressure responsive valve and a restriction in series with one of said pneumatic relays to effect a delay in the firing of said one pneumatic relay whereby the operation of said circuit is avoided in response to irregular fluctuations in the size of the material.

References Cited by the Examiner
UNITED STATES PATENTS 3,088,061   4/1963   Smith _____ 72—10

CHARLES W. LANHAM, *Primary Examiner.*

R. D. GREFE, *Assistant Examiner.*